United States Patent
Lawal et al.

(10) Patent No.: US 12,143,193 B1
(45) Date of Patent: *Nov. 12, 2024

(54) PROCESSOR BASED METHOD AND SYSTEM FOR TRANSMITTING IMAGE DATA MATRIX

(71) Applicant: KING FAHD UNIVERSITY OF PETROLEUM AND MINERALS, Dhahran (SA)

(72) Inventors: Abdulmajid Lawal, Dhahran (SA); Karim Abed-Meraim, Dhahran (SA); Qadri Mayyala, Dhahran (SA); Naveed Iqbal, Dhahran (SA); Azzedine Zerguine, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,124

(22) Filed: Jul. 23, 2024

Related U.S. Application Data

(63) Continuation of application No. 18/295,957, filed on Apr. 5, 2023, now Pat. No. 12,101,160.
(Continued)

(51) Int. Cl.
*H04B 7/08* (2006.01)
*H04B 7/0408* (2017.01)

(52) U.S. Cl.
CPC ......... *H04B 7/0854* (2013.01); *H04B 7/0408* (2013.01)

(58) Field of Classification Search
CPC .............. H04B 7/0854; H04B 7/0408
(Continued)

(56) References Cited

U.S. PATENT DOCUMENTS

| | | | | |
|---|---|---|---|---|
| 1,210,160 | A * | 12/1916 | Frankignoul | E21B 7/00 |
| | | | | 175/321 |
| 11,216,985 | B2 * | 1/2022 | Li | H04N 19/597 |

(Continued)

FOREIGN PATENT DOCUMENTS

CN 112184567 A 1/2021

OTHER PUBLICATIONS

Fouad Boudjenouia, et al., "Robust, blind multichannel image identification and restoration using stack decoder", IET Image Processing, The Institution of Engineering and Technology, vol. 13, Issue 3, 2019, pp. 475-482.
(Continued)

*Primary Examiner* — Emmanuel Bayard
(74) *Attorney, Agent, or Firm* — Oblon, McClelland, Maier & Neustadt, L.L.P.

(57) ABSTRACT

A device, method, and non-transitory computer readable medium that for two-dimensional blind single-input multiple-output channel identification for image restoration. The method includes receiving, by a receiver having independent channels, a two-dimensional image data matrix then transforming the received two-dimensional image data matrix to a one-dimensional image vector. Channel parameters can then be estimated using the one-dimensional image vector. The method can then construct a restored image using the estimated channel parameters and the two-dimensional image data matrix.

1 Claim, 11 Drawing Sheets

Related U.S. Application Data

(60) Provisional application No. 63/330,014, filed on Apr. 12, 2022.

(58) Field of Classification Search
USPC .......................................... 375/262, 316, 340
See application file for complete search history.

(56) References Cited

U.S. PATENT DOCUMENTS

| | | | | |
|---|---|---|---|---|
| 2012/0249732 | A1* | 10/2012 | Mizutani | H04N 13/111 348/42 |
| 2014/0119669 | A1* | 5/2014 | Ingham-Dempster | H04N 19/34 382/232 |
| 2016/0266057 | A1* | 9/2016 | Dudovich | G02B 21/367 |
| 2019/0044682 | A1* | 2/2019 | Hebron | H04L 25/0204 |
| 2019/0349223 | A1 | 11/2019 | Pisupati et al. | |
| 2020/0059650 | A1* | 2/2020 | Lu | H04N 19/117 |

OTHER PUBLICATIONS

Wided Souidene, et al., "A new look to Multichannel Blind Image Deconvolution", IEEE Transactions on Image Processing, vol. 18, Issue 7, Jul. 2009, pp. 1487-1500.

Iwan Wirawan, et al., "Blind Multichannel Image Restoration Using Subspace Based Method", IEEE International Conference on Acoustics, Speech, and Signal Processing (ICASSP), May 2003, pp. V9-V12.

Fouad Boudjenouia, et al., "Sequential Stack Decoder for Multichannel Image Restoration", 24$^{th}$ European Signal Processing Conference (EUSIPCO), 2016, pp. 1293-1297.

* cited by examiner

PROCESSOR BASED METHOD AND SYSTEM FOR TRANSMITTING IMAGE DATA MATRIX

STATEMENT OF PRIOR DISCLOSURE BY AN INVENTOR

Aspects of this technology are described in A. Lawal, K. Abed-Meraim, N. Iqbal, A. Zerguine and Q. Mayyala, "Blind 2D-SIMO Channel Identification using Helix Transform and Cross Relation Technique," 2021 International Wireless Communications and Mobile Computing (IWCMC), Harbin City, China, 2021, pp. 1338-1342, doi: 10.1109/IWCMC51323.2021.9498917.

CROSS REFERENCE TO RELATED APPLICATIONS

The present application is a Continuation of U.S. application Ser. No. 18/295,957, now allowed, having a filing date of Apr. 5, 2023 which claims benefit of priority to U.S. Provisional Application No. 63/330,014, having a filing date of Apr. 12, 2022, which is incorporated herein by reference in its entirety.

STATEMENT OF ACKNOWLEDGEMENT

The inventors acknowledge the financial support provided by provided by the Deanship of Scientific Research of King Fahd University of Petroleum and Minerals (KFUPM), Riyadh, Saudi Arabia under Research Grant SB181001.

BACKGROUND

Technical Field

The present disclosure is directed to a system and method for blind two-dimensional single-input multiple-output (SIMO) channel identification.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multichannel blind image restoration is a technique used to recover an original image given several blurred or noisy image observations. Three general approaches are often used to recover the image. One approach involves direct restoration of the original image and is often referred to as equalization or deconvolution. The second approach initially identifies a channel and then restores the desired image. The last approach is similar to the second, but instead jointly identifies the channel and restores the image. Methods of the first approach are of special interest and can be further classified into stochastic methods (e.g., maximum likelihood, minimum mean square error solution, maximum a posteriori, etc.) and deterministic methods. In stochastic methods observed images are assumed to be random and the original image is estimated to be the most probable realization of a random process. However, stochastic methods are highly sensitive to perturbation and modeling errors because they depend on strong statistical hypotheses.

Deterministic methods however do not depend on such hypotheses and instead estimate the original image by minimizing a norm of a certain residuum. Most deterministic techniques have been applied to one-dimensional application, with only some being extended to two-dimensional applications. Minimum noise subspace (MNS) and symmetric minimum noise subspace (SMNS) are two such examples, with the latter being developed from the former. In SMNS, a certain amount of images are used more than others which leads to poor estimation of the original image. Another example includes least squared smoothing (LSS) which is robust against channel order overstimation but can only be applied to two-dimensional applications under restrictive conditions. Cross Relation (CR) is yet another method and is known for its simplicity, efficiency, and low computational costs.

Each of the aforementioned methods suffers from one or more drawbacks hindering their adoption. Accordingly, it is one object of the present disclosure to provide methods and systems for more efficient systems and methods to provide for blind two-dimensional-SIMO channel identification.

SUMMARY

In an exemplary embodiment, a method for two-dimensional blind single-input multiple-output channel identification for image restoration performed by a receiver. The method comprises receiving, by two or more receiver antennas of the receiver having independent channels, a two-dimensional image data matrix. The method then includes transforming the received two-dimensional image data matrix to a one-dimensional image vector. The method can then estimate channel parameters using the one-dimensional image vector. Then method can then construct a restored image using the estimated channel parameters and the two-dimensional image data matrix.

In another exemplary embodiment, a system for two-dimensional blind single-input multiple-output channel identification for image restoration is provided. The system comprises a transmitter comprising a transmitter antenna and a receiver. The receiver comprises two or more transmitter antennas having independent channels and configured to receive a two-dimensional image data matrix and a processing module. The processing module is configured to perform a method including: transforming the received two-dimensional image data matrix to a one-dimensional image vector; estimating channel parameters using the one-dimensional image vector; and constructing a restored image using the estimated channel parameters and the two-dimensional image data matrix.

In yet another exemplary embodiment, a non-transitory computer readable medium having instructions stored therein that, when executed by one or more processors, cause the one or more processors to perform a method of receiving, by two or more receiver antennas of the receiver having independent channels, a two-dimensional image data matrix; transforming the received two-dimensional image data matrix to a one-dimensional image vector; estimating channel parameters using the one-dimensional image vector; and constructing a restored image using the estimated channel parameters and the two-dimensional image data matrix.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
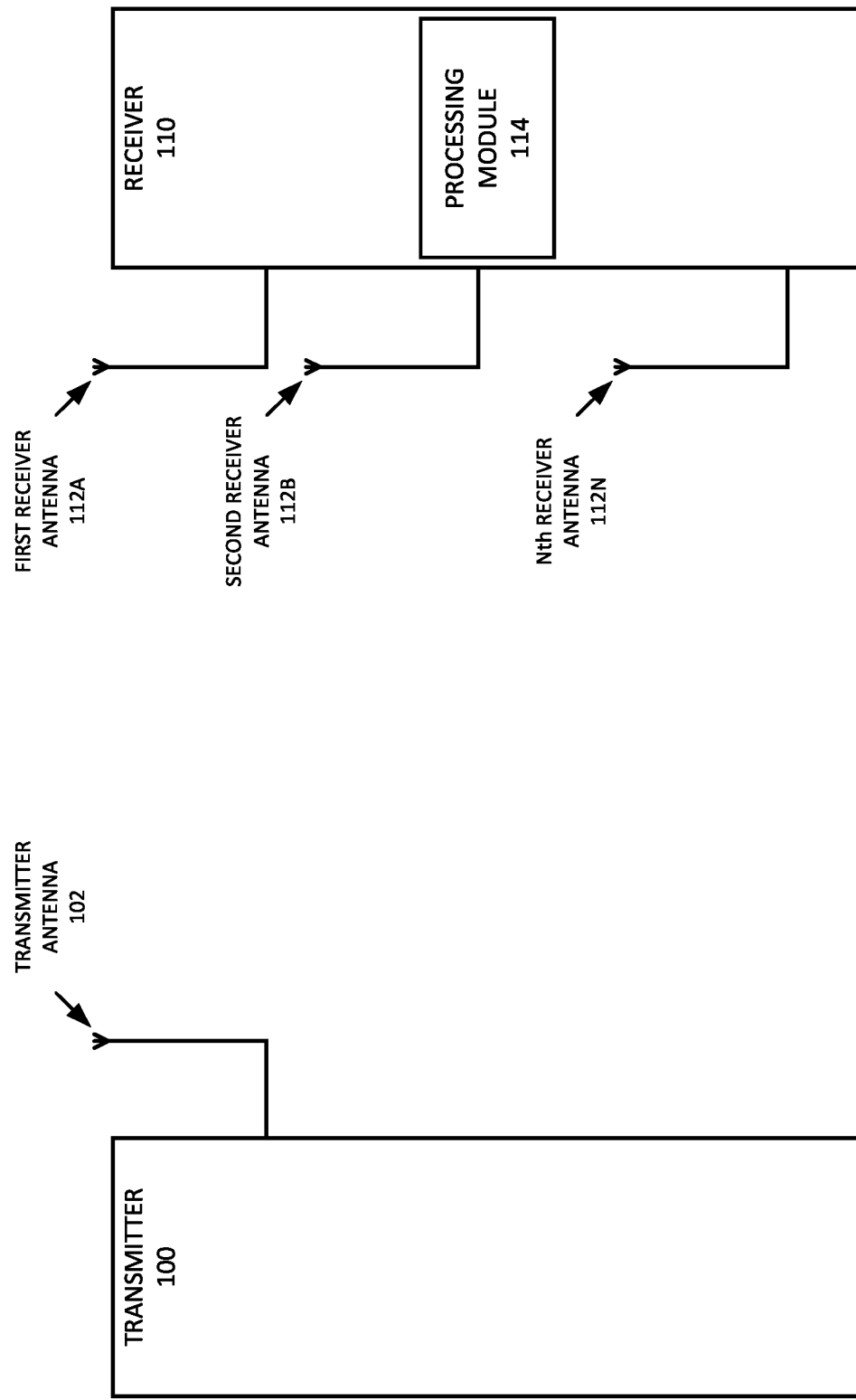
FIG. 1 shows a block diagram of a single-input multiple-output system according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for blind 2-D single-input multiple-output channel identification. Embodiments use a helix transformation in conjunction with Cross Relation (CR) to recover an original image. Embodiments estimate a two-dimensional channel by using the helix transform to convert a two-dimensional convolution of an image and channel into one-dimensional convolutions. Embodiments then use Cross Relation to estimate unknown channel coefficients to identify the channel. One advantage achieved by embodiments is the ability to restore an image in circumstances when only two channels are available. More generally, embodiments allow for prior one-dimensional methods to be adapted for use in two-dimensional blind system identification. Embodiments can be used to enhance the quality of an image. For example, a camera or mobile phone can receive or image a noisy image and can use embodiments to deblur said image. Another example can include optical device, such as a microscope or telescope can employ methods to enhance the quality of imaging.

FIG. 1 shows a block diagram of a single-input multiple-output system according to certain embodiments. The single-input multiple-output system can comprise a transmitter 100 and a receiver 110.

The transmitter 100 can comprise a transmitter antenna 102. In some embodiments, the transmitter 100 may be included on a mobile phone, camera, or optical imaging devices such as a microscope, a telescope, an endoscope, etc. In such examples, the transmitter 100 can obtain an image using included imaging devices (e.g., through photography, downloading an image, tomography, etc.).

The receiver 110 can comprise a plurality of receiver antennas, shown as a first receiver antenna 112A, a second receiver antenna 112B, and an n-th receiver antenna 112N, and a processing module 114. Although the receiver 110 is shown to have three receiver antennas in FIG. 1, the receiver 100 can comprise any suitable number of receiver antennas, such as 2, 4, 8, 16, 32, 64, 128, or 256. The processing module 114 can be used to perform computations and methods described herein. For example, the processing module 114 can enable the receiver 110 to perform the method described by FIG. 3.

The receiver 110 can observe a single image F of size $m_f \times n_f$ through K independent noisy channels. For example, the receiver 110 can receive an image obtained and transmitted by the transmitter 100. More specifically, the transmitter 100 can be a first mobile phone that took a photo of a dog and transmitted the photo to the receiver 110 that can be a second mobile phone. The image F can have a vectorized form of $f_i=[f_i(1, 1), f_i(1, 2), \ldots,]$, $y_1, \ldots, y_K$ can represent the corresponding K vectorized blurred images, each of size $m_y \times n_y$, $h_1, \ldots, h_K$ can represent the K vectorized channel's impulse response, each of size $m_h$, $n_h \times 1$ with $h_i=[h_i(1, 1), h_i(1,2), \ldots, h_i(m_h, n_h)]^T$, and $w_1, \ldots, w_K$ denoting the additive noise term in each of the K channels. Adopting a causal notation, the system model of the i-th channel (e.g., the i-th image) can be written as:

$$y_i(m,n)=x_i(m,n)+w_i(m,n) \quad (1)$$

where $$x_I(m, n) = \sum_{l_1=0}^{m_h-1} \sum_{l_2=0}^{n_h-1} h_i(m, n) f(m-l_1, n-l_2).$$

Based on the SIMO model presented, the blind estimation of the K unknown channels can be performed using the Cross Relation (CR) method.

Cross Relation is described Cross Relation is simple and has low computational complexity. This is achieved by exploiting the commutativity of the convolution according to the following equation.

$$h_i * x_j(m,n) = h_j * x_i(m,n) = h_i * h_j * f(m,n) \quad (2)$$

Equation (2) can be rewritten in a matrix form as follows:

$$[x_i(m, n)^T - x_j(m, n)^T] \begin{bmatrix} h_j \\ h_i \end{bmatrix} = 0, \forall (i, j), \forall (m, n) \quad (3)$$

where $h_1, \ldots, h_K$ represent the column-wise vectorized versions of the channel matrices and $x_i(m, n)=[x_i(m, n), x_i(m-1, n), \ldots, x_i(m-m_h, n-n_h)]^T$. Considering all K(K−1)/2 equation pairs in a matrix leads to the following equation:

$$\Psi(m,n)h=0, \forall(m,n) \quad (4)$$

where $h=[h_1^T, \ldots, h_K^T]$ is the channels parameter vector and $\Psi(m, n)$ is defined by the following equations:

$$\Psi(m, n) = \begin{bmatrix} \Psi_1(m, n) \\ \vdots \\ \Psi_{K-1}(m, n) \end{bmatrix} \quad (5)$$

where the matrices are given by $$\Psi_i(m, n) = \begin{bmatrix} 0 & \cdots & x_{i+1}^T(m, n) & -x_i^T(m, n) & 0 \\ \vdots & \vdots & & \ddots & \vdots \\ 0 & \cdots & x_k^T(m, n) & 0 & -x_i^T(m, n) \end{bmatrix}$$

for i=1, ..., K−1. Upon certain channel diversity conditions, such as in those described in G. B. Giannakis and R. W. Heath, "Blind identification of multichannel fir blurs and perfect image restoration," *IEEE Transactions on Image Processing*, vol. 9, no. 11, pp. 1877-1896, 2000 (incorporated herein by reference), the above relations characterize the channel vector h uniquely. In a noisy scenario, $x_i$ is replaced by $y_i$, and equation (4) is solved using least squares according to the following equation:

$$\hat{h} = \arg\min_h \sum_{m,n} \|\Psi(m, n)h\|_2^2 = \arg\min_h (h^T Q h) \quad (6)$$

where Q represents the quadratic form of the Cross Relation criterion.

The helix transform, introduced and described further in J. Claerbout, "Multidimensional recursive filters via a helix," *Geophysics*, vol. 63, no. 5, pp. 1532-1541, 1998 (incorporated herein by reference), requires two steps to be performed. The first step includes zero padding, while the second step includes the lexicographic ordering of elements. To illustrate, the convolution of two-dimensional signals $F_{M \times N}$ and $H_{K \times L}$ where M×N and K×L are the respective sizes of F and H is considered. The zero-padded matrices of the signals are as follows.

$$F'_{(M+K-1) \times (N+L-1)} = \begin{bmatrix} F & 0 \\ 0 & 0 \end{bmatrix}$$

$$H'_{(M+K-1) \times (N+L-1)} = \begin{bmatrix} H & 0 \\ 0 & 0 \end{bmatrix}$$

Let $\bar{f}$ and $\bar{h}$ be the resulting vectors produced by the lexicographic ordering (either column-wise or row-wise) of F' and H' respectively. The last elements of $\bar{f}$ and $\bar{h}$ can be truncated to correspond to the last element of F and H respectively. The respective lengths of $\bar{f}$ and $\bar{h}$ will be [(N−1)×(M+K−1)+M] and [(L−1)×(M+K−1)+K]. It can be shown, such as in M. Naghizadeh and M. D. Sacchi, "Multidimensional convolution via a one-dimensional convolution algorithm," *The Leading Edge*, vol. 28, no. 11, pp. 1336-1337, 2009 (incorporated herein by reference), that the one-dimensional convolution of $\bar{f}$ and $\bar{h}$ is equivalent to the two-dimensional convolution of F and H.

Embodiments apply the helix transformation to received images, and make use of the one-dimensional equivalent form of the above equation (1), shown as the following:

$$\bar{y}_i(n) = \bar{h}_i(n) * \bar{f}(n) + \bar{w}_i(n) \quad (7)$$

where $\bar{y}_i(n)$, $\bar{h}_i(n)$, $\bar{f}(n)$, and $\bar{w}_i(n)$ are the one-dimensional counterparts (using the previously described helix transform) of the two-dimensional signals (e.g., $y_i(m, n)$, $h_i(m, n)$, $f(m, n)$, and $w_i(m, n)$).

An example of the helix transform transforming a two-dimensional channel and signal into one-dimensional equivalents is described. Consider a channel matrix H and a signal matrix F. The convolution of H and F yields a new matrix Y by equation (8) below.

$$Y = H * F \quad (8)$$

As an illustration, let H be a 2×2 matrix and F be a 3×3 matrix as follows:

$$H = \begin{bmatrix} h_{11} & h_{12} \\ h_{21} & h_{22} \end{bmatrix}$$

$$F = \begin{bmatrix} f_{11} & f_{12} & f_{13} \\ f_{21} & f_{22} & f_{23} \\ f_{31} & f_{32} & f_{33} \end{bmatrix}$$

The two-dimensional convolution of H and F is equal to:

$$Y = \begin{bmatrix} h_{11} & h_{12} \\ h_{21} & h_{22} \end{bmatrix} * \begin{bmatrix} f_{11} & f_{12} & f_{13} \\ f_{21} & f_{22} & f_{23} \\ f_{31} & f_{32} & f_{33} \end{bmatrix}$$

To perform the helix transform, both H and F must be zero-padded and the zero-padded vectors should be vectorized.

In a first step, both matrices can be zero-padded based on their dimensions. In this case, two matrices of dimensions (2+3−1)×(2+3−1) are formed, that is:

$$\bar{H} = \begin{bmatrix} h_{11} & h_{12} & 0 & 0 \\ h_{21} & h_{22} & 0 & 0 \\ 0 & 0 & 0 & 0 \\ 0 & 0 & 0 & 0 \end{bmatrix}$$

$$\bar{F} = \begin{bmatrix} f_{11} & f_{12} & f_{13} & 0 \\ f_{21} & f_{22} & f_{23} & 0 \\ f_{31} & f_{32} & f_{33} & 0 \\ 0 & 0 & 0 & 0 \end{bmatrix}$$

In a second step, the zero-padded matrices $\bar{H}$ and $\bar{F}$ are vectorized, and the ending zeros are eliminated. This operation is described by $\bar{h}=\text{Vec}(\bar{H})$ and $\bar{f}=\text{Vec}(\bar{F})$ and are as follows:

$$\bar{h} = [h_{11} h_{21} 0\ 0 h_{12} h_{22}]$$

$$\bar{f} = [f_{11} f_{21} f_{31} 0\ f_{12} f_{22} f_{32} 0\ f_{13} f_{23} f_{33}]$$

In a third step, $\bar{h}$ and $\bar{f}$ are convolved to give a one-dimensional equivalent of a vectorized vector $\bar{y}=\text{Vec}(Y)$:

$$\bar{y} = \bar{h} * \bar{f} \quad (10)$$

In a fourth step, the vector $\bar{y}$ can be reshaped into a (2+3−1)×(2+3−1) matrix that is equal to Y. Hence, $Y = \text{mat}_{(2+3-1) \times (2+3-1)}[\bar{y}]$. For a general case of a matrix H of size a×b and a matrix F of size c×d, the length of each channel $\bar{h}$ is given as $L_h = (a+c-1)(b-1)+a$, while the length of $\bar{f}$ is given as $L_f = (a+c-1)(d-1)+c$. It can be noted that the helix transform of the received two-dimensional signal is performed by vectorizing the two-dimensional signal and the estimated channel is accompanied by the padded zeros as shown in the vector $\bar{h}$. The knowledge of the channel size allows for the elimination of the padded zeros.

A fundamental assumption in two-dimensional channel estimation states that channels should be coprime and have no common factors is not violated by performing the helix transform. The helix transform does not destabilize the coprime status of the channel and does not introduce common factors into the channel matrix. The condition of no pairwise common factors for the channel matrices is satisfied with a probability of 1.

An approach similar to the above described can be followed to obtain equation (4) and can be followed to obtain the equivalent cross relations $\bar{\Psi}(n)\bar{h}=0$. Matrices $\bar{\psi}(n)$ and $\bar{h}=[\bar{h_1}^T, \ldots, \bar{h_K}^T]^T$, which are one-dimensional, can be considered as the helix transformed equivalent of the two-dimensional matrices $\Psi(m, n)$ and h respectively.

Figure 2:
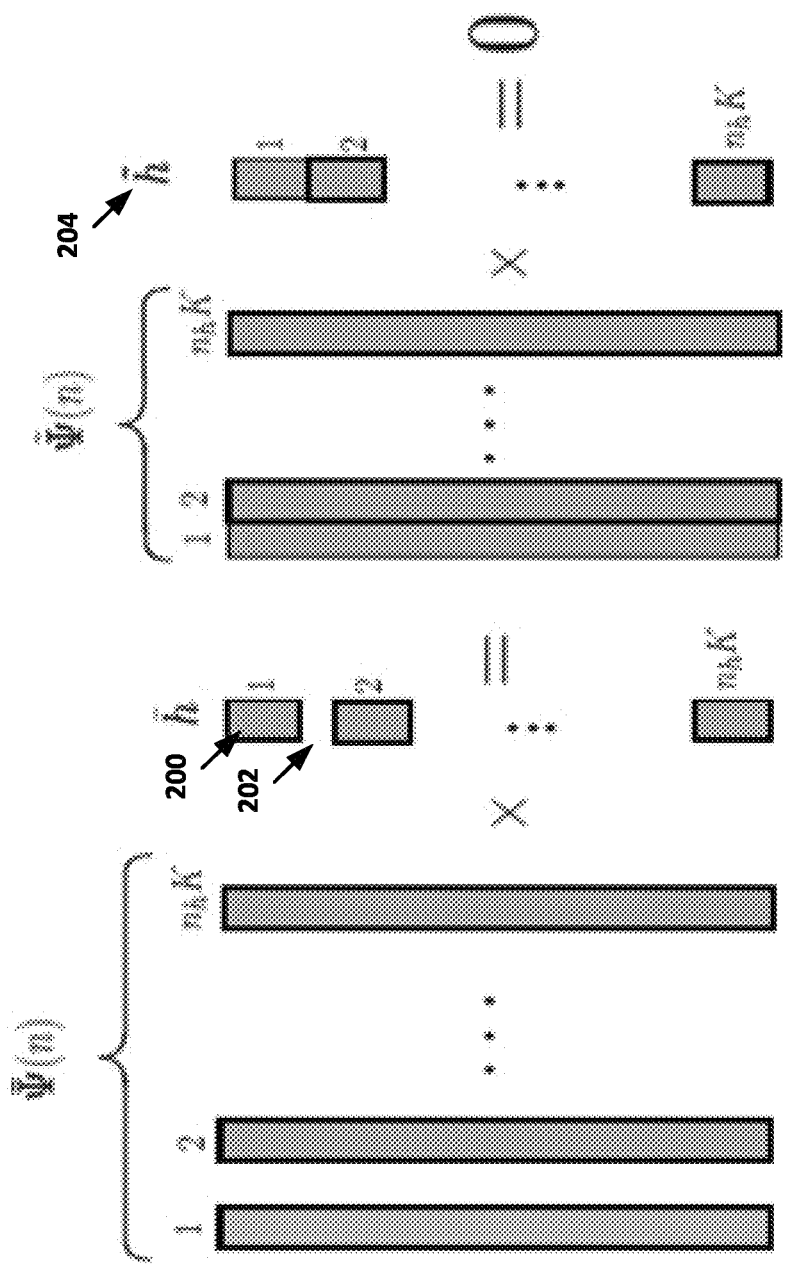
FIG. 2 shows an exemplary illustration of a helix transform according to certain embodiments.

FIG. 2 shows an exemplary illustration of a helix transform according to certain embodiments. Due to the inherent zero-padding of the helix transform, the parameter vector and h is of large dimensional size (i.e., its size is equal to $K((n_h-1)(m_H+m_f)+m_h)$ and is proportional to the row size of the image) and hence a direct implementation of the one-dimensional CR method is prohibitive. To reduce the cost, the known zero-valued entries of $\bar{h}$ are used to skip the unnecessary columns of the vector $\bar{\Psi}(n)$ and as such reduce the parameter vector size to $Kn_h m_h$ (i.e., the size of $\tilde{h}$). This is illustrated in FIG. 2, where the darker shading (indicated by 200 in FIG. 2) represents the portion that has the channel information, while the empty space (indicated by 202 in FIG. 2) represents the zeros that are introduced into $\bar{h}$ as a result of the helix transform.

Once all zeros are eliminated (e.g., after obtaining the vector 204), the h matrix can be obtained by solving a least squares minimization problem described by equation (11) below.

$$\hat{h} = \underset{\tilde{h}}{\mathrm{argmin}} \sum_n \|\Psi(n)\tilde{h}\|_2^2 = \arg\min_{\tilde{h}} \tilde{h}\tilde{Q}\tilde{h} \qquad (11)$$

To avoid the trivial solution $\tilde{h}=0$, the least squares criterion is optimized under the unit-norm constraint (i.e., $\|\tilde{h}\|^2=1$). In this case, the desired solution is given by the least eigenvector f of the quadratic form $\tilde{Q}$.

Embodiments have been described in relation to the Cross Relation method, however, embodiments can be used with other methods similar to Cross Relation (CR) (e.g., Symmetric Cross Relation (SCR), Robust Cross Relation (RCR) or Robust Symmetric Cross Relation (R-SCR) which are described in F. Boudjenouia, K. Abed-Meraim, A. Chetouani, and R. Jennane, "Robust, blind multichannel image identification and restoration using stack decoder," *IET Image Processing*, vol. 13, no. 3, pp. 475-482, 2018, (incorporated herein by reference)), or yet other identification methods (e.g., deterministic methods such as Subspace (SS), Minimum Noise Subspace (MNS) or Symmetric Minimum Noise Subspace (SMNS), Least Squared Smoothing (LSS), and Mutually Referenced Equalizers (MRE) that are described in W. Souidene, K. Abed-Meraim, and A. Beghdadi, "Deterministic techniques for multichannel blind image deconvolution," in *Proceedings of the Eighth International Symposium on Signal Processing and Its Applications*, 2005., vol. 1, pp. 439-442, IEEE, 2005, (incorporated herein by reference)). Embodiments can employ helix transformation and Cross Relation to deal with the special case of two channels (i.e., K=2). This is because the diversity condition for the one-dimensional multichannel blind identification is that the channel's transfer function $\bar{h}_i(z)$ for i=1, . . . , K does not share common zeros (where z represents the z-transform). As mentioned above, this occurs with a probability of 1 if the coefficients of the channels $h_i$ are randomly distributed with non-degenerated probability density functions. In the case of two noiseless channels and considering f(m, n)=0, if (m, n) is not within a perfect reconstruction range defined as: $[0, m_f-1]\times[0, n_f-1]$, then perfect reconstruction is possible.

Figure 3:
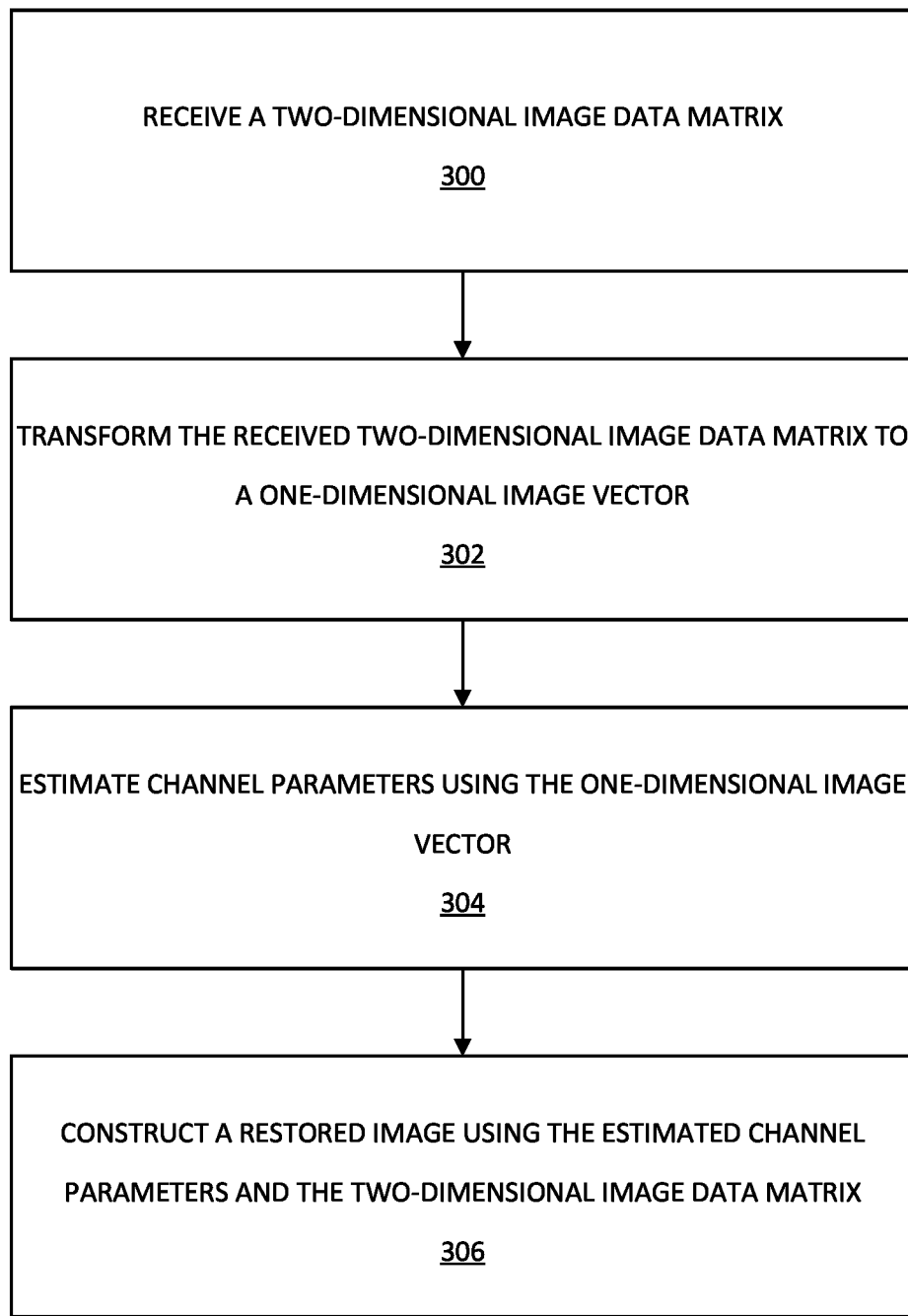
FIG. 3 shows a method two-dimensional blind single-input multiple-output channel identification for image restoration according to certain embodiments.

FIG. 3 shows a method two-dimensional blind single-input multiple-output channel identification for image restoration according to certain embodiments. The method described by FIG. 3 can be performed between the transmitter 100 and the receiver 110 of FIG. 1. The processing module 114 can comprise circuitry that enables the receiver 110 to perform the method described below.

At step 300, the receiver 110 can receive a two-dimensional image data matrix. The receiver 110 can receive the two-dimensional image data matrix using two or more receiver antennas 112 that have independent channels. As described by equation (1), the two-dimensional image data matrix can comprise a product of channel parameters and original image data, and additive noise. The two-dimensional image data matrix can be transmitted by the transmitter 100 using the transmitter antenna 102 to the receiver 110. In some embodiments, the two-dimensional image data matrix can be obtained by the transmitter 100 using an accompanying imaging device. For example, the transmitter 100 can be on a first mobile phone that comprises a camera. The camera can be used to the two-dimensional image data matrix, which can then be sent to the receiver 110, which can be a second mobile phone.

At step 302, the receiver 110 can transform the received two-dimensional image data matrix to a one-dimensional image vector. The receiver 110 can perform the transformation using a helix transformation. More specifically, the helix transformation can include zero-padding the two-dimensional image data matrix and vectorizing the zero-padded two-dimensional image data matrix to form the one-dimensional image vector. The receiver 110 can further process the one-dimensional image vector to remove tail zeroes.

At step 304, the receiver 110 can estimate channel parameters using the one-dimensional image vector. The receiver 110 can perform the estimation by using the least squares minimization seen in equation (11), which includes the quadratic form of the Cross Relation criterion. The least squares minimization can be optimized to the unit-norm constraint. In some embodiments, the estimation can be performed using an identification method similar to Cross Relation, or a deterministic identification method.

At step 306, the receiver 110 can construct a restored image using the estimated channel parameters and the two-dimensional image data matrix. The restored image is constructed using a deconvolution filter computed from the pseudo-inverse of the estimated channel matrix (each row of the latter matrix represents a deconvolution filter with certain delays. Preferably, a delay(s) equal or close to the channel sizes should be considered.

The performance of the method above is compared to existing methods, such as SS, MNS, SMNS, CR, and LSS methods. In a first stage, the convolution of the image and channel is performed in two-dimensions, and is then helix transformed to rearrange the convolved signal and lexicographic ordering as if the convolution was performed in one-dimensional. The zeros introduced as a result of the helix transform are eliminated while forming the quadratic matrix Q, leading to a reduced computational complexity.

The performance of various methods are compared at different values of signal to noise ratios (SNR) using normalized mean squared error (NMSE). To reduce the scalar ambiguity of blind identification, NMSE is computed as:

$$NMSE = 10\log_{10}\min_{\alpha \in \mathbb{R}}\left(\frac{\|\alpha h_{est} - h\|^2}{\|h\|^2}\right)$$

$$NMSE = 10\log_{10}\left(1 - \frac{(h_{est}^T h)^2}{\|h\|^2 \|h_{est}\|^2}\right)$$

where $h_{est}$ refers to the estimated channel vector.

In the first experiment, the case with K=2 with a channel size varied in the range $n_h=m_h \in [2, 4]$ is tested. The image is fixed, and the channels are randomly generated for each run of the Monte Carlo scheme for up to 100 runs.

Figure 4:
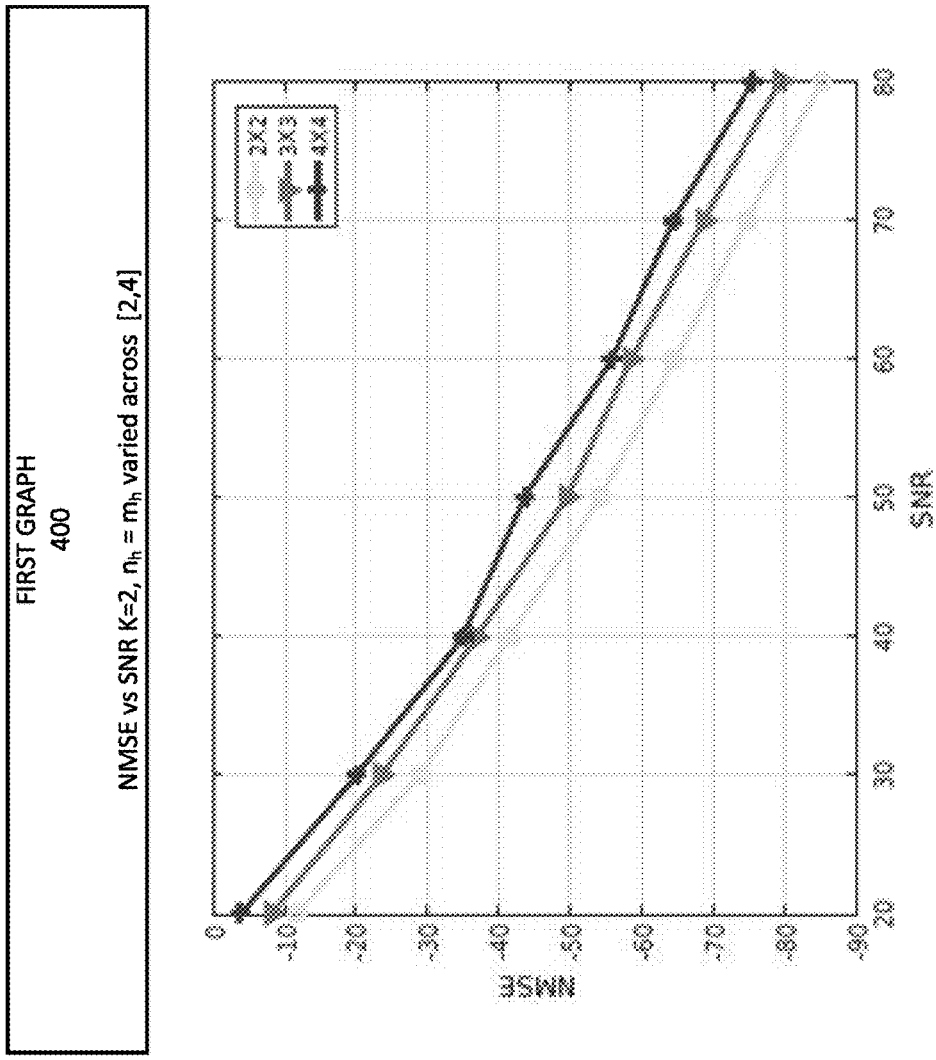
FIG. 4 shows a first graph according to certain embodiments.

FIG. 4 shows a first graph 700 according to certain embodiments. FIG. 4 depicts the results of the NMSE value vs SNR. It is observed that as the SNR increases, the NMSE improves dramatically.

Figure 5:
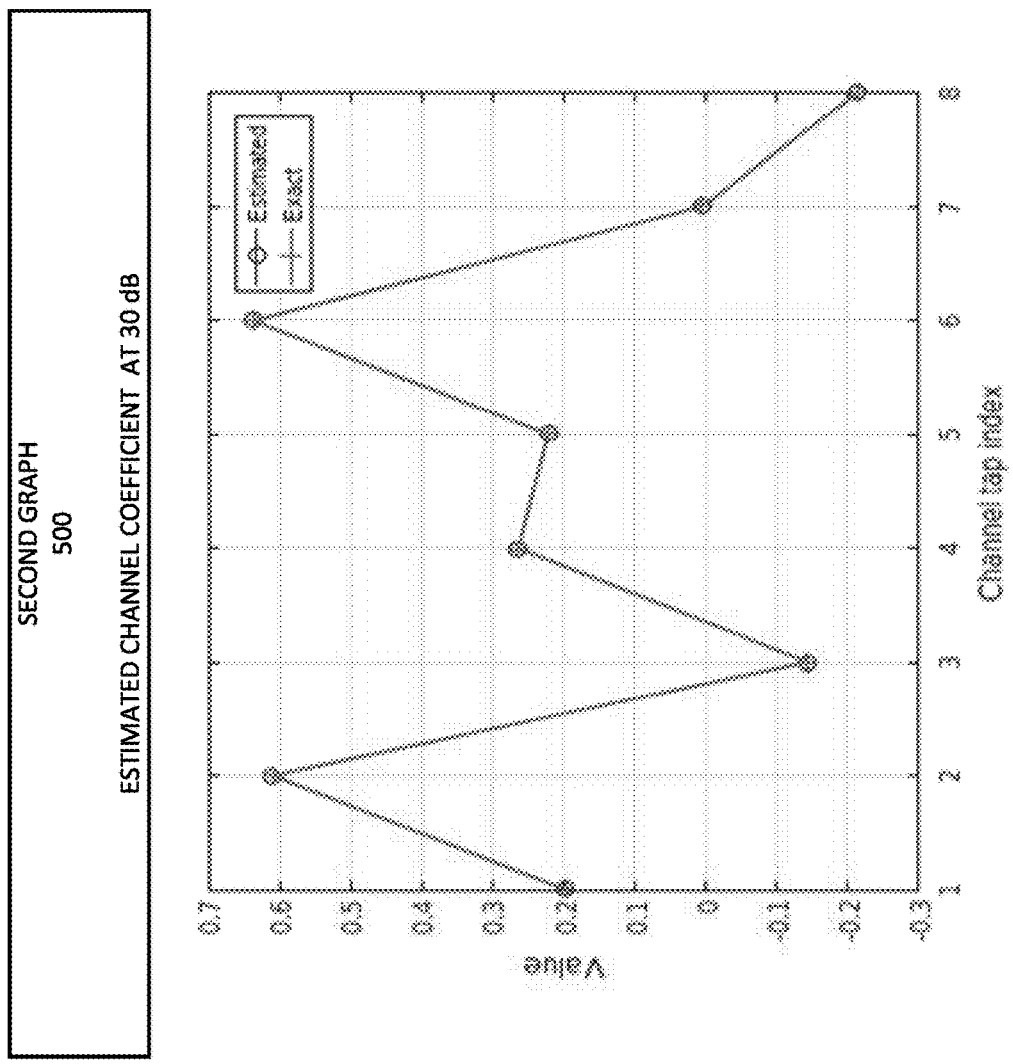
FIG. 5 shows a second graph according to certain embodiments.

In addition, the estimated channel coefficients are compared to exact values, the plot is shown by FIG. 5.

FIG. 5 shows a second graph according to certain embodiments. The estimated channel coefficients are generated at a SNR of 30 dB. It is observed that the estimated channel values matches very well to the exact channel value.

As a second experiment, embodiments (denoted as H-CR in FIGS. 6 and 7) are tested against existing methods for K=4 and $n_h=m_h=3$.

Figure 6:
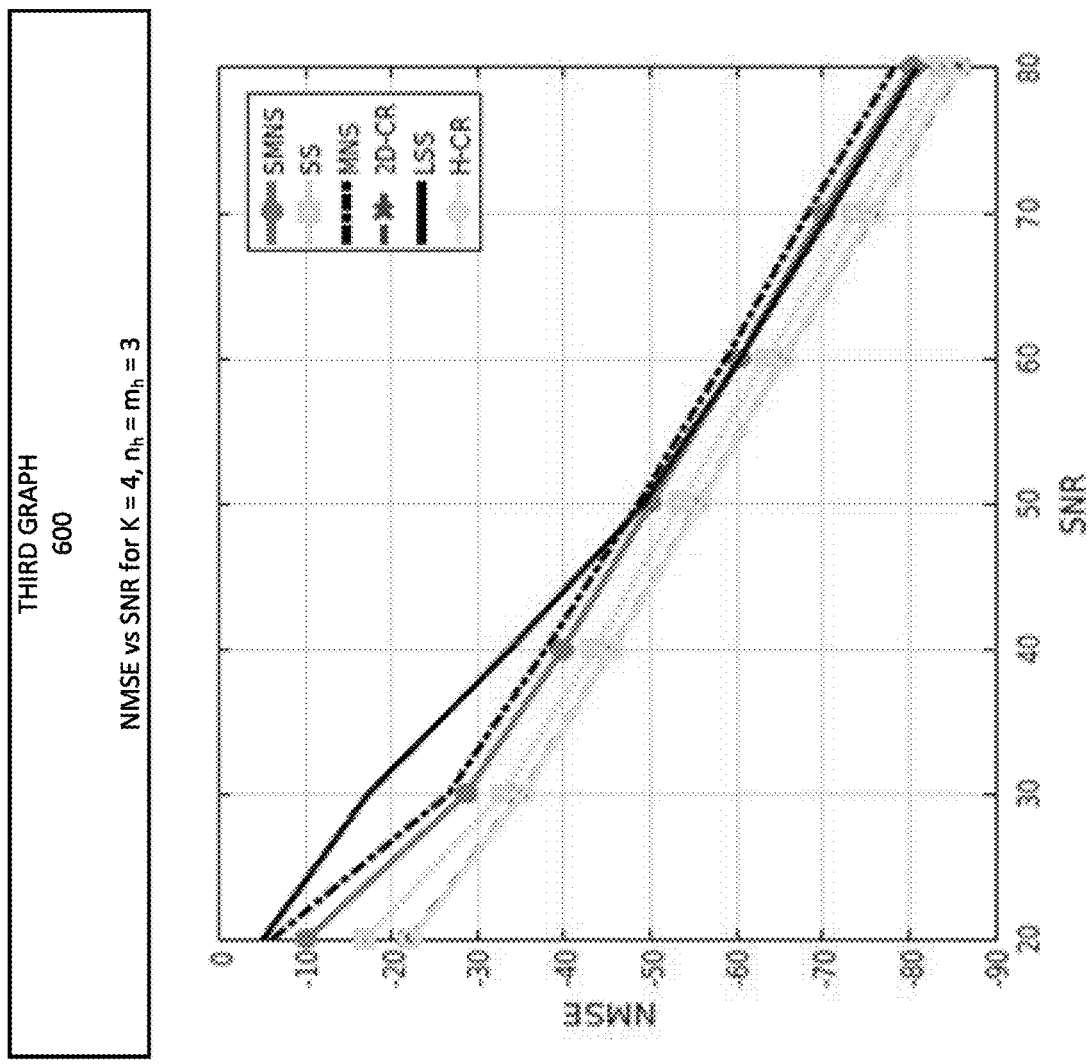
FIG. 6 shows a third graph according to certain embodiments.

FIG. 6 shows a third graph 600 according to certain embodiments. The third graph 600 compares the NMSE vs SNR for various identification methods including SMNS, SS, MNS, two-dimensional-CR (two-dimensional Cross Relation), and LSS. Embodiments perform in a similar manner to the existing identification methods.

In a final experiment, embodiments are compared with existing identification methods for K=4 and $n_h=m_h=3$.

Figure 7:
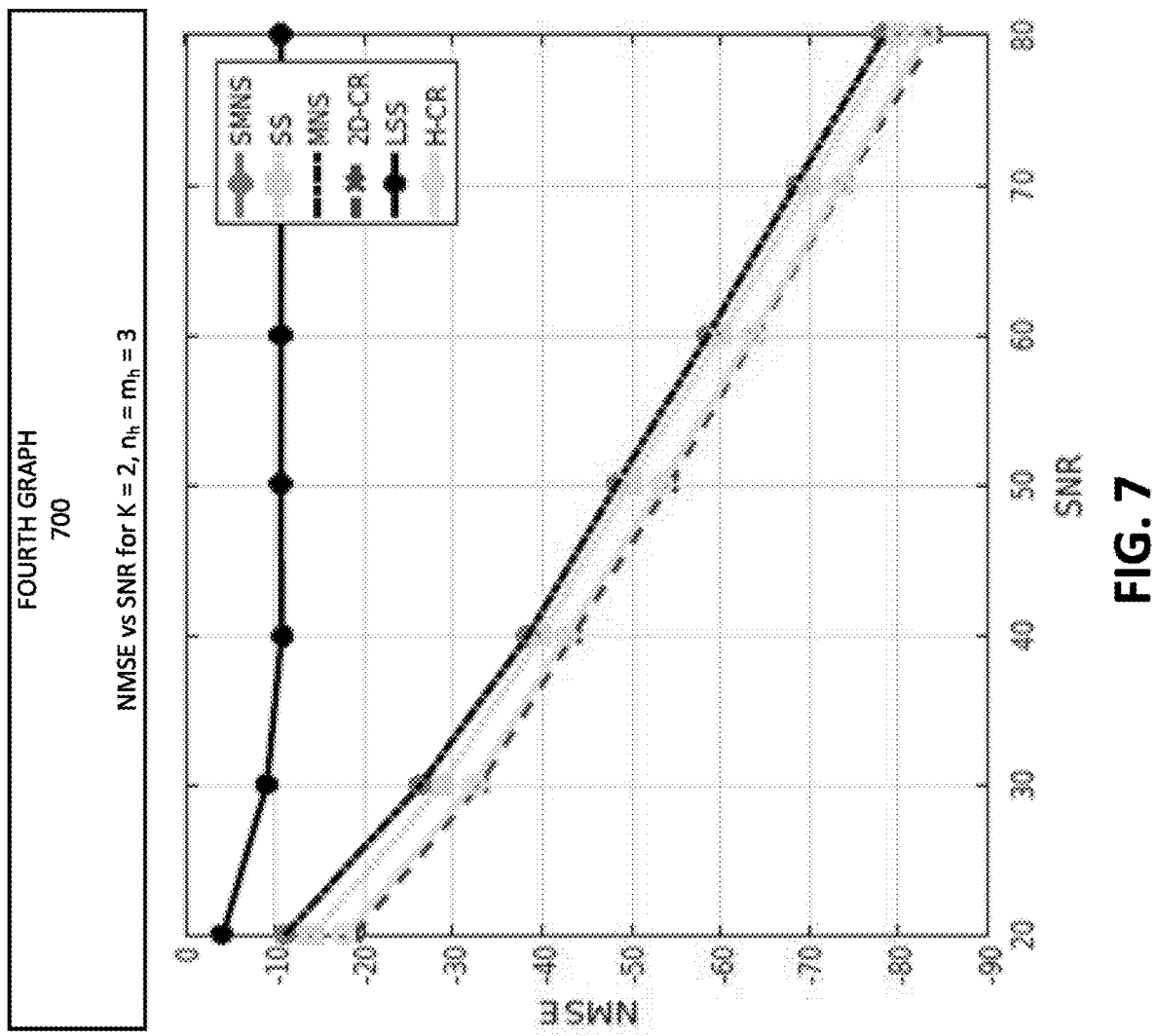
FIG. 7 shows a fourth graph according to certain embodiments.

FIG. 7 shows a fourth graph 700 according to certain embodiments. The fourth graph 700 shows the NMSE vs SNR for various identification methods including SMNS, SS, MNS, two-dimensional-CR, and LSS. Embodiments perform similarly to other two-dimensional identification techniques. Embodiments use the helix transform to implement a computationally heavy two-dimensional algorithm in one-dimensional without loss of performance.

Next, further details of the hardware description of the computing environment according to exemplary embodiments is described with reference to FIG. 8. The controller 800 can be representative of, or included as an additional component of, the transceiver 100 and/or receiver 110 of FIG. 1, in which the controller acts as a computing device which can perform processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

Figure 8:
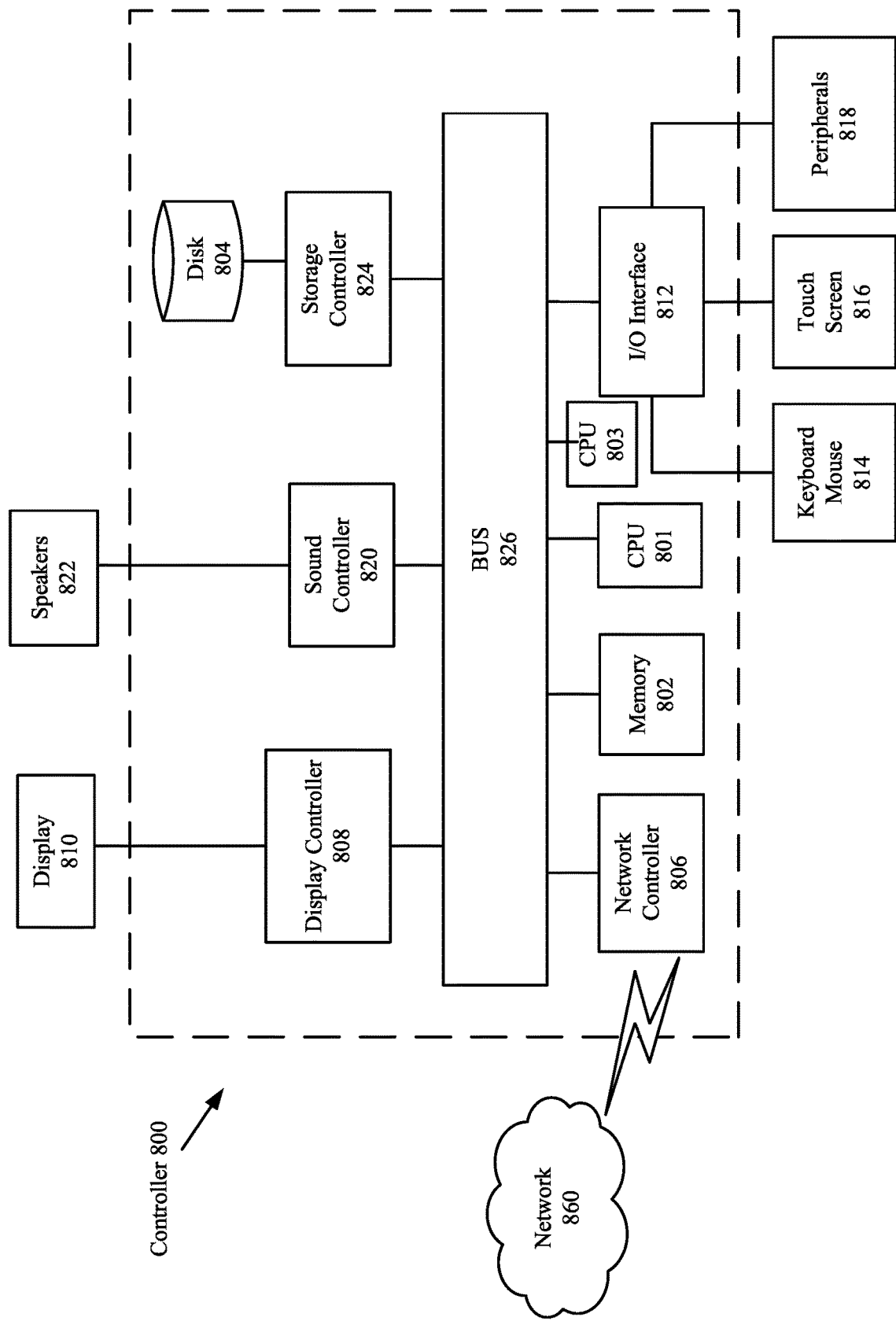
FIG. 8 is an illustration of a non-limiting example of details of computing hardware used in the computing system, according to certain embodiments.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
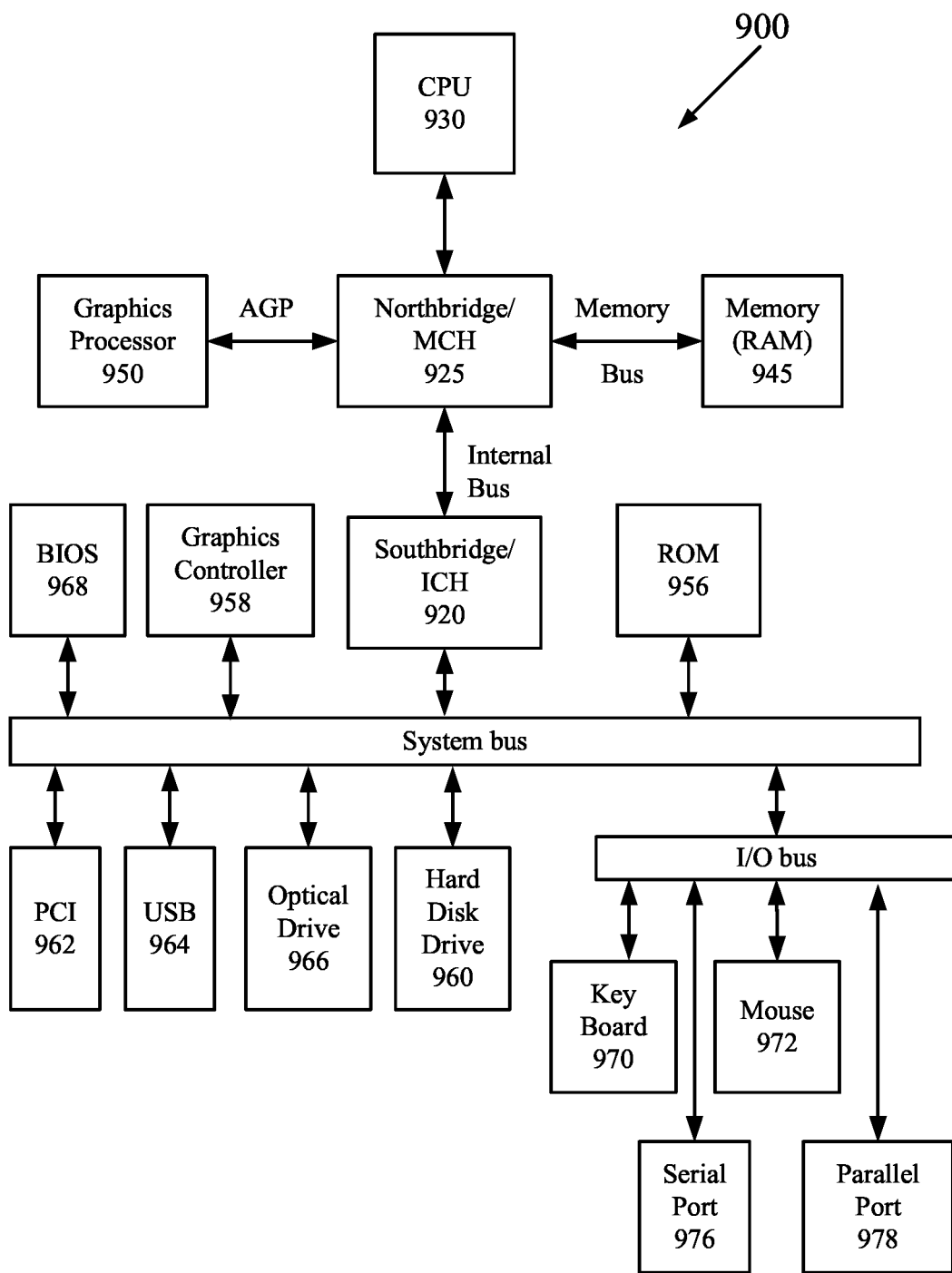
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
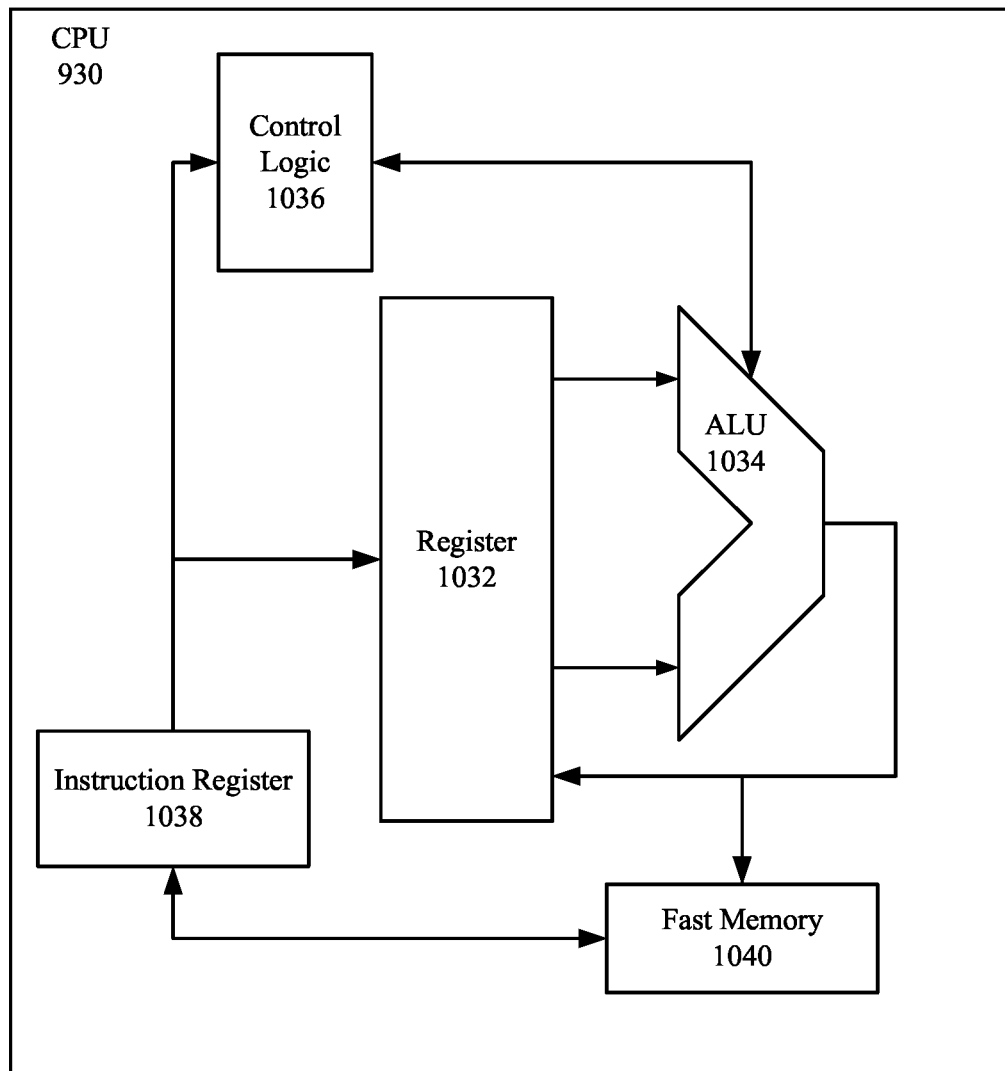
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 888 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
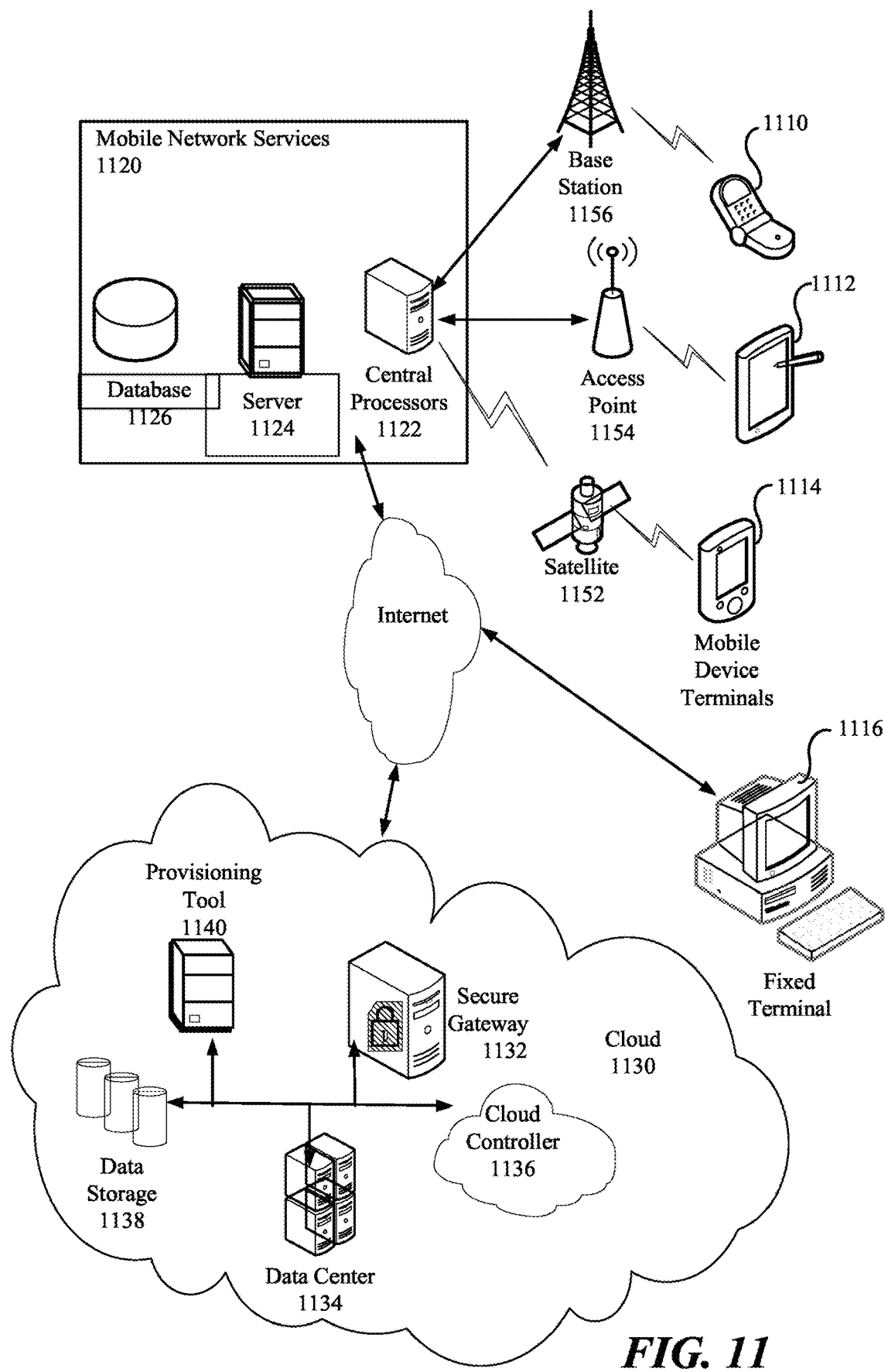
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A non-transitory computer readable medium having instructions stored therein that, when executed by one or more processors, cause the one or more processors to perform a method including:

transmitting a two-dimensional image data matrix with a first mobile phone having a camera;

receiving, by two or more receiver antennas of the receiver having independent channels, the two-dimensional image data matrix, wherein the receiver is a second mobile phone;

transforming the received two-dimensional image data matrix to a one-dimensional image vector;

estimating channel parameters using the one-dimensional image vector; and constructing a restored image using the estimated channel parameters and the two-dimensional image data matrix.

* * * * *